Figure 1:
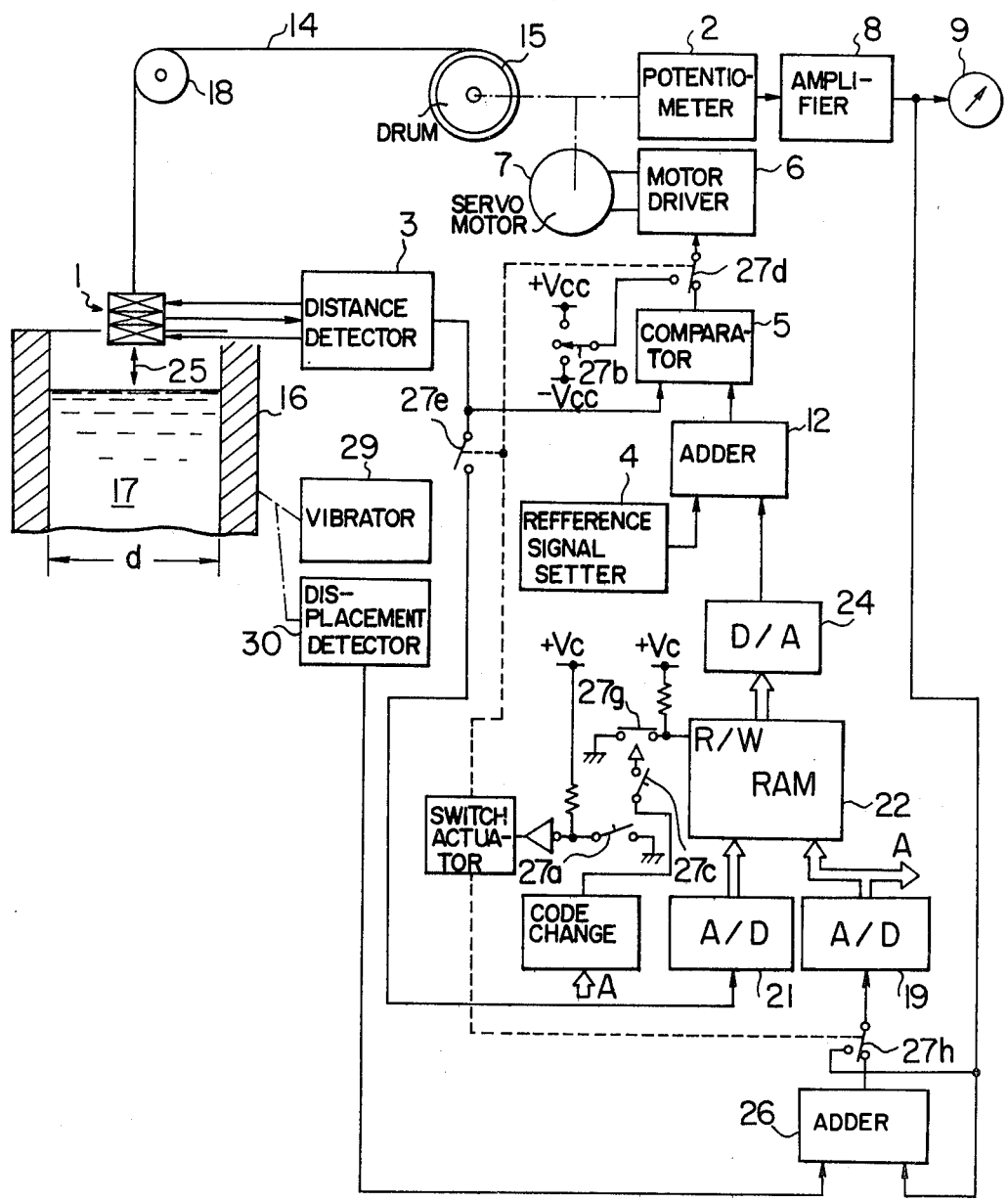

United States Patent [19]

Sawada et al.

[11] 4,442,389

[45] Apr. 10, 1984

[54] APPARATUS FOR MEASURING A METAL SURFACE POSITION

[75] Inventors: Yasuhiro Sawada, Fuchu; Tadashi Inoue, Noogata; Toyoaki Nishida, Kitakyushu, all of Japan

[73] Assignees: Nippon Steel Corp., Tokyo; Mishima Kosan Co., Ltd., Kitakyushu, both of Japan

[21] Appl. No.: 386,387

[22] Filed: Jun. 8, 1982

[30] Foreign Application Priority Data

Mar. 22, 1982 [JP] Japan ................................. 57-45315

[51] Int. Cl.³ .............................................. G05D 9/00
[52] U.S. Cl. ................................... 318/642; 318/482; 318/632; 364/508
[58] Field of Search .......................... 73/290, DIG. 1; 364/508, 509; 318/482, 632, 642, 460

[56] References Cited

U.S. PATENT DOCUMENTS

| | | | |
|---|---|---|---|
| 3,463,980 | 8/1969 | Cohn et al. | 318/642 |
| 3,463,981 | 8/1969 | Wires | 318/642 |
| 3,969,941 | 7/1976 | Rapp | 318/482 X |
| 4,027,233 | 5/1977 | Shmakov et al. | 318/642 X |
| 4,120,611 | 10/1978 | Salve | 318/482 |
| 4,140,953 | 2/1979 | Dunne | 318/632 X |

Primary Examiner—B. Dobeck
Attorney, Agent, or Firm—Pollock, Vande Sande & Priddy

[57] ABSTRACT

In an apparatus having a magnetic sensing type metal sensor arranged in spaced relation to a surface of metal under measurement and reciprocable in a predetermined direction, a tracing unit for driving the sensor in accordance with a change in the output of the sensor due to a change of position of the metal in the predetermined direction for causing the sensor to follow the surface position of the metal, and a measuring unit for measuring the surface position of the metal based on a current position of the sensor; a metal surface position measuring apparatus comprising a measuring and storing device for measuring a noise component in the output of the sensor due to factors other than a change of the surface position of the metal and storing the noise component, and correction device for correcting the output of the sensor by the stored noise component and causing the sensor to be moved in accordance with the corrected output.

7 Claims, 9 Drawing Figures

APPARATUS FOR MEASURING A METAL SURFACE POSITION The present invention relates to an apparatus for measuring metal surface position, and more particularly to an apparatus for non-contact measuring a surface position of metallic mass such as a molten steel, a shielded and unaccessable metal or a moving metal which is difficult to be directly measured.

In detecting a level of molten steel in a mold of a continuous steel casting, an automatic tracing or follow measuring apparatus has been proposed, in which a detection coil which is movable by a servo motor is arranged at a predetermined distance from a molten metal surface, a change of a distance between the melt surface and the detection coil due to movement of the melt surface is detected from a change in inductance of the detection coil, the servo motor is driven by the detection signal so that the detection coil is moved to follow the movement of the detection coil so as to maintain the predetermined distance from the melt surface and the melt surface is measured based on the distance in movement of the detection coil driven by the servo motor. Such a measuring apparatus is disclosed in, for example, Japanese Patent Publication No. 54-42846, and Japanese Patent Application No. 53-152949. However, the measuring from change in inductance is valid only when the inductance varies linearly to the change of distance. Since some noises due to influence of the mold or a peripheral equipment are usually included, the distance between the molten steel surface and the detector is not always in linear relationship with to the inductance of the detector.

Accordingly, it is an object of the present invention to provide an apparatus for measuring a metal surface position from a change in inpedance of a detection coil due to a change of a distance between the detection coil and the metal surface, in which noises due to metallic subjects other than the metal to be measured are eliminated to allow precise measurement of the metal surface position.

According to the present invention, there is provided an apparatus for measuring a change of metal surface position along a predetermined direction, having a magnetic sensing type metal sensor arranged in spaced relation to the metal surface in the predetermined direction, the sensor being reciprocable along said predetermined direction, a drive unit operative to drive the sensor along the predetermined direction, a tracing unit for comparing an output of the sensor with a predetermined reference value and activating the drive unit in accordance with a difference signal of the comparison for causing the sensor to follow the change along the predetermined direction of the surface position of the metal, and a device for measuring the surface position of the metal based on a current position of the sensor, wherein the apparatus comprises measuring and storing means for measuring a noise component in the output of the sensor due to factors other than the change of the surface position of the metal and storing the noise component; and correction means for correcting the difference signal by the noise component stored in said measuring and storing means for activating the drive unit by the corrected signal.

Figure 2:
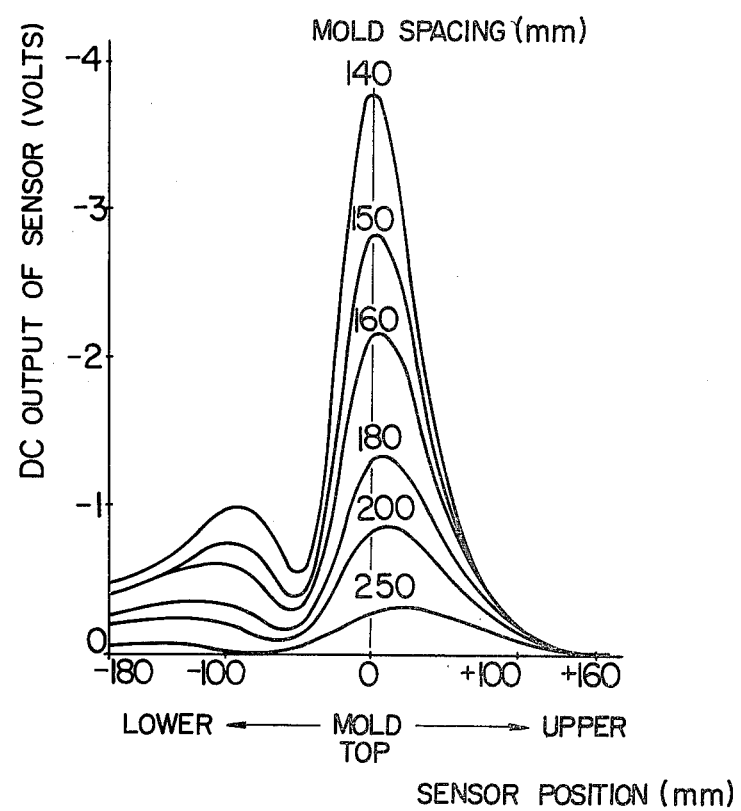
Figure 3:
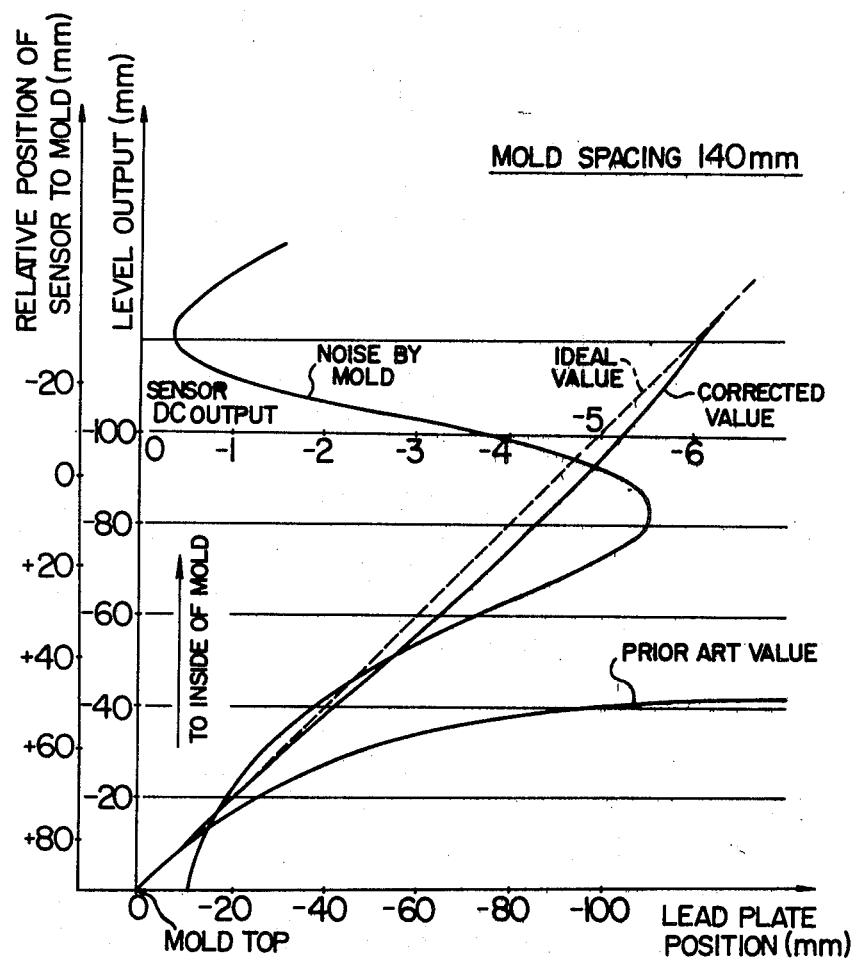
Figure 4:
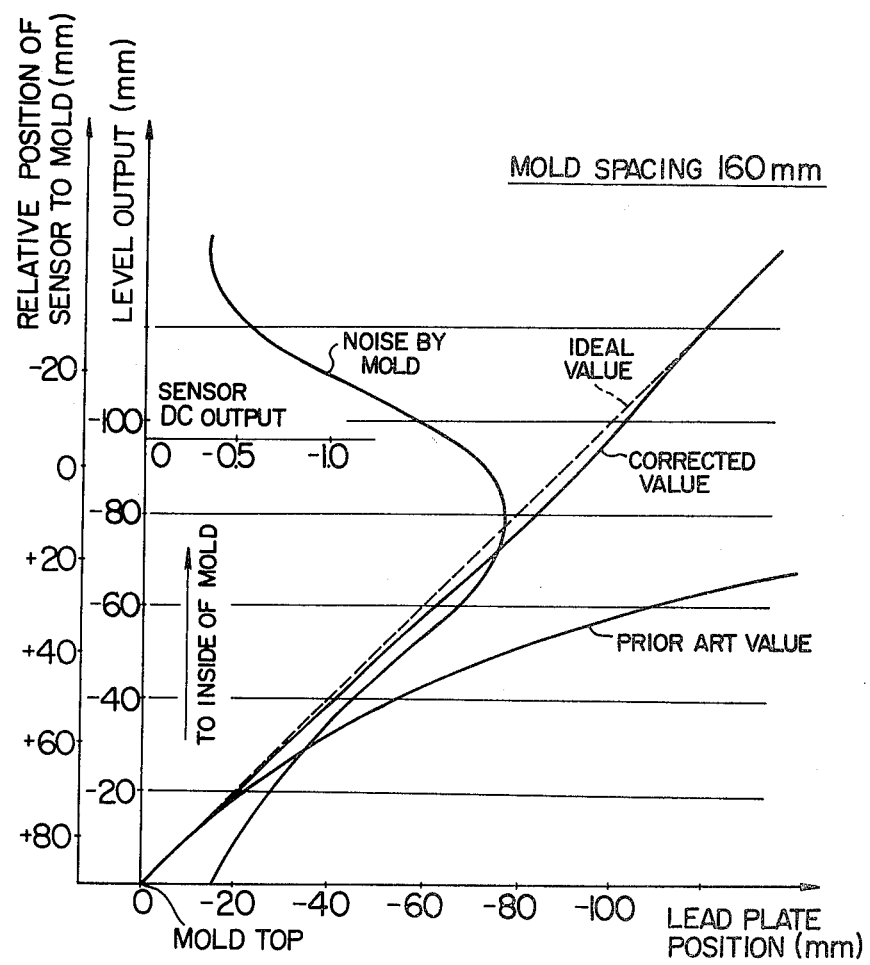
Figure 5:
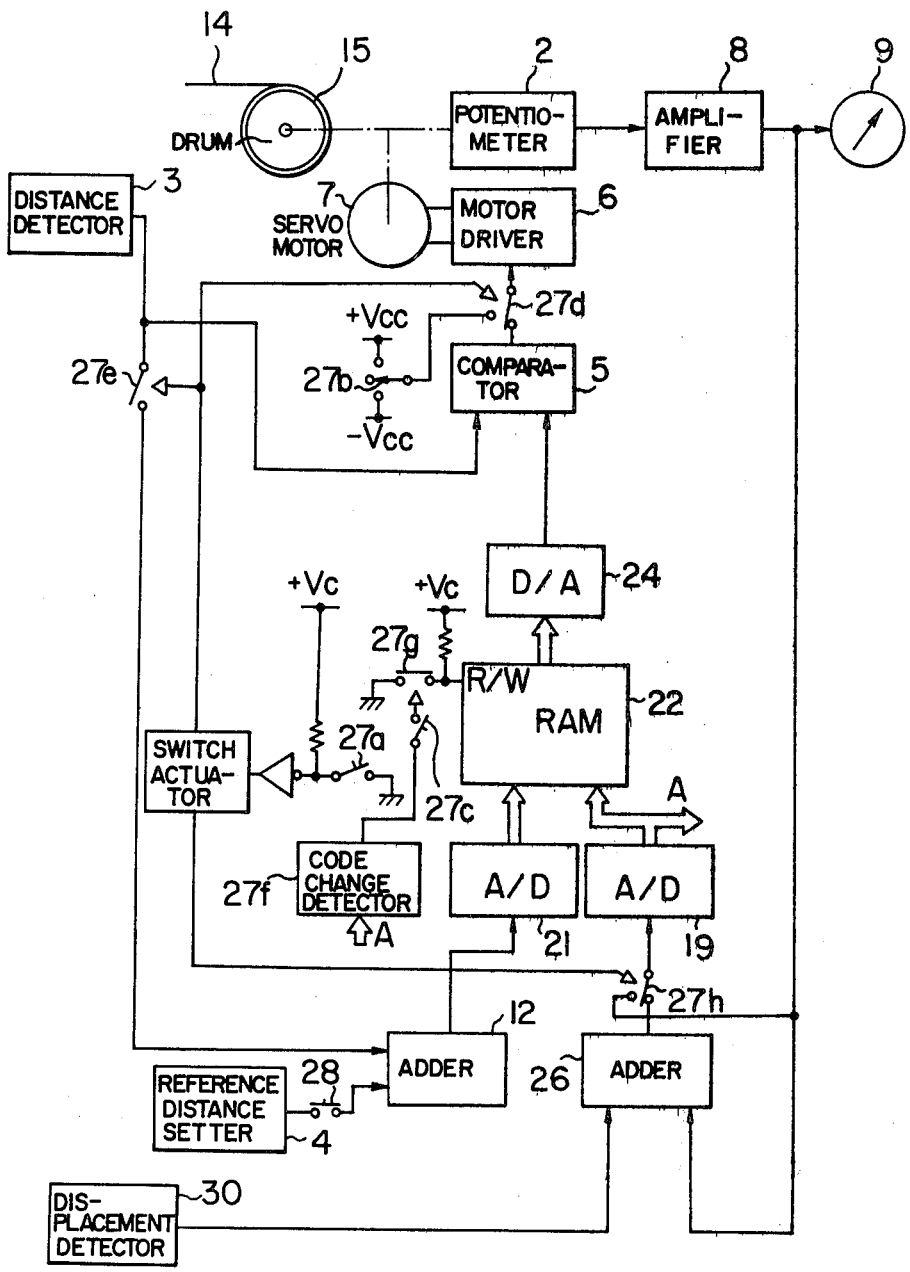
Figure 6:
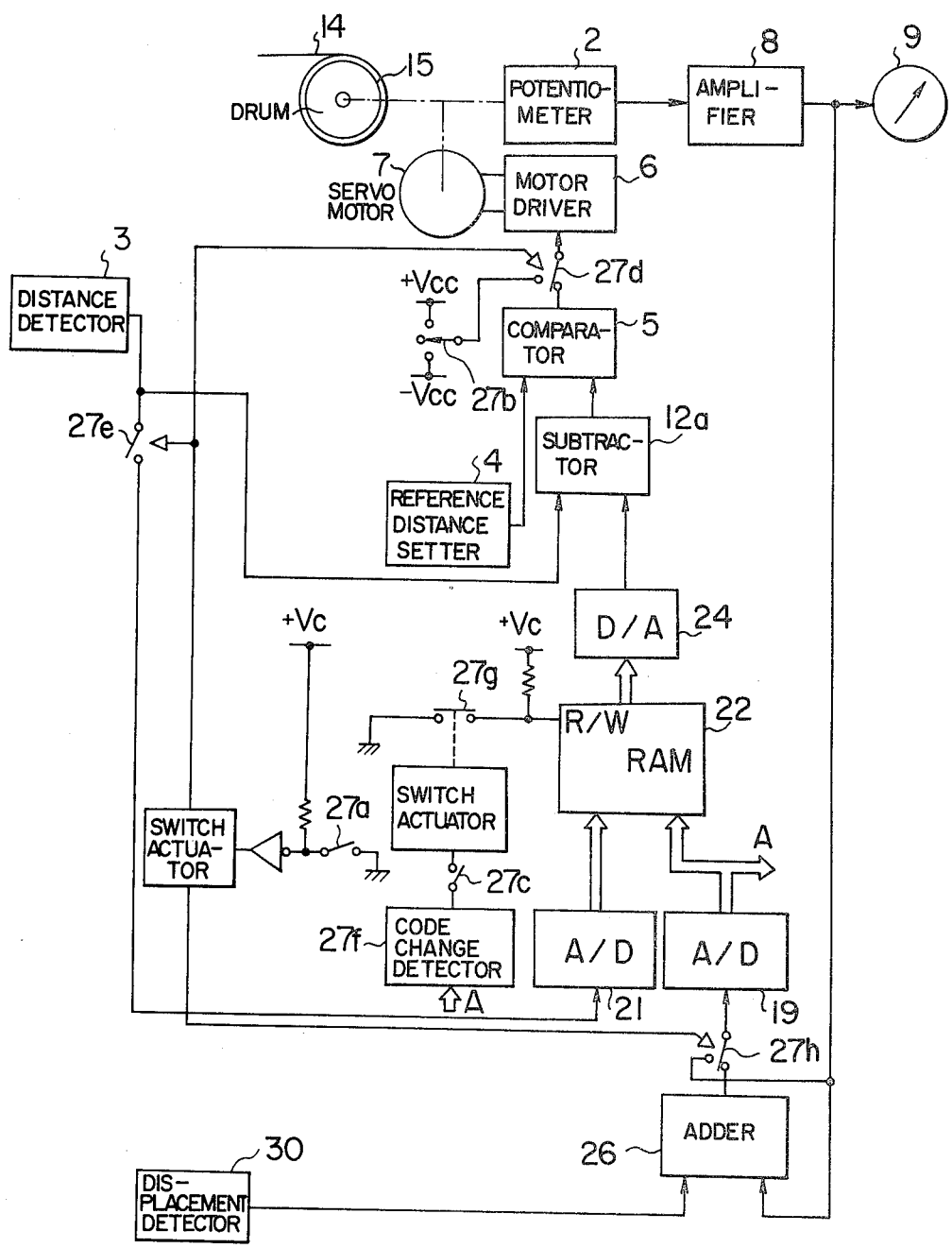
Figure 7:
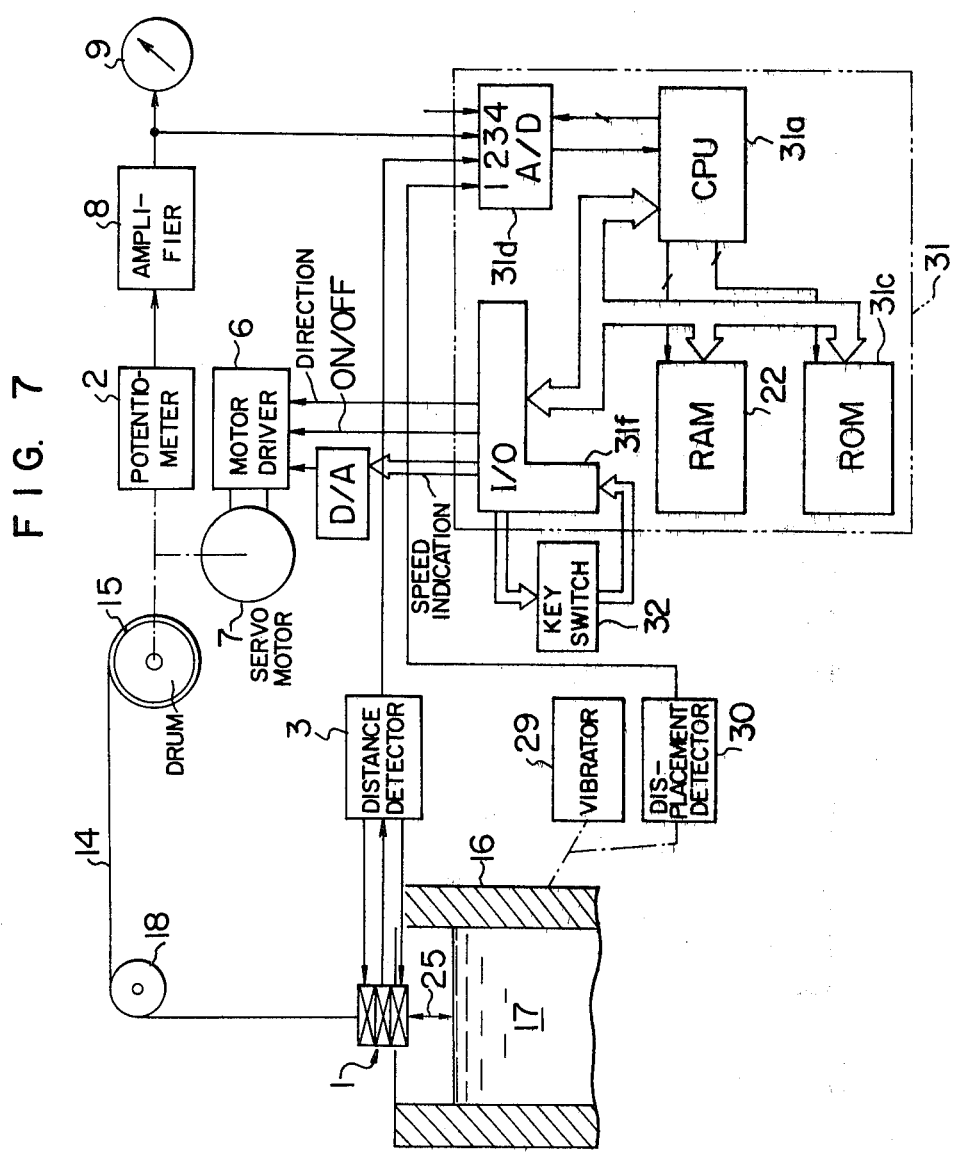
Figure 8:
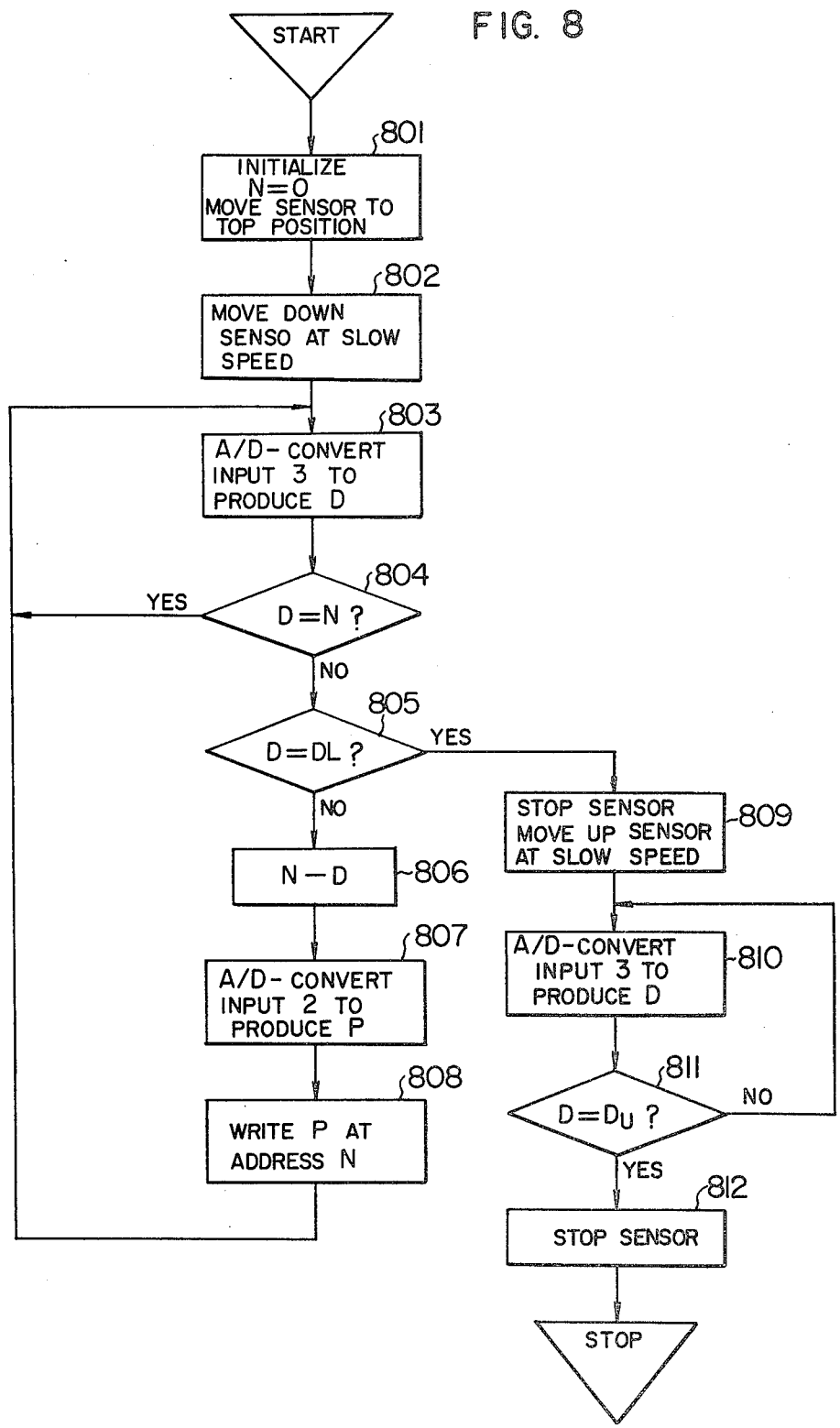
Figure 9:
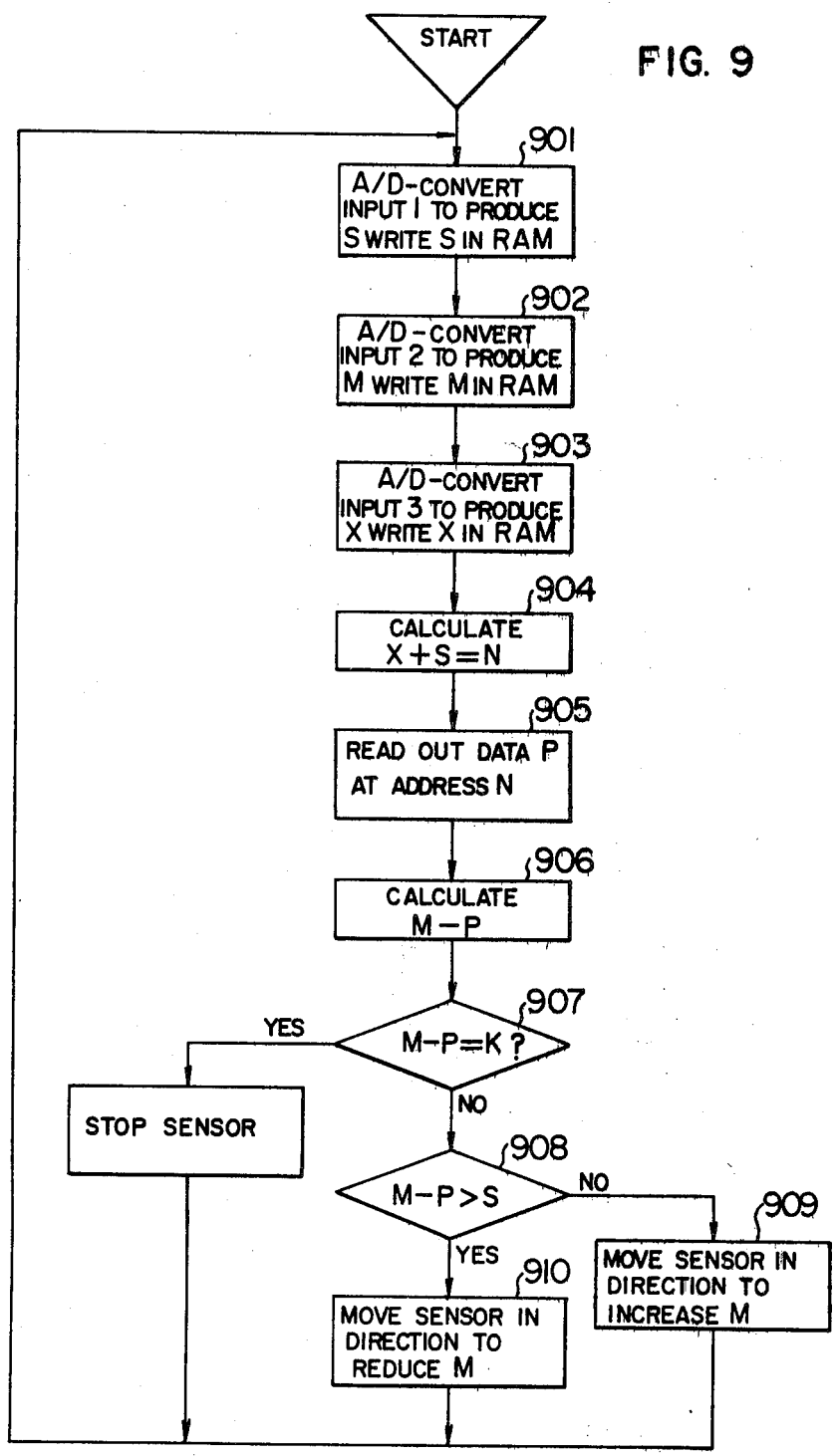

The features of the present invention will be well understood from the following description of the embodiments of the present invention with reference to the accompanying drawings in which:

FIG. 1 shows a block diagram of a circuit arrangement of a measuring apparatus of the present invention, FIG. 2 shows a noise characteristic due to peripheral equipments in a detection output of a detection coil used in the present invention, FIGS. 3 and 4 show output characteristics of the measuring apparatus of FIG. 1, FIGS. 5, 6 and 7 show block diagrams of circuits of other embodiments of the present invention, and FIGS. 8 and 9 show flow charts for computer processing in the embodiment of FIG. 7.

With reference to FIG. 1 showing a circuit configuration of one embodiment of the present invention, which is particularly designed to measure a melt surface position or level in a mold of a continuous casting for making steel slabs, numeral 1 denotes a detector which uses a magnetic sensor of flux-balanced type, numeral 2 denotes a potentiometer, numeral 3 denotes a distance detector, numeral 4 denotes a reference level setter, numeral 5 denotes a comparator, numeral 6 denotes a servo circuit, numeral 7 denotes a servo motor, numeral 8 denotes an amplifier, numeral 9 denotes a level indicator, numeral 14 denotes a strip for transmitting the driving power of the servo motor to the sensor 1, numeral 18 denotes a free wheel, numeral 15 denotes a strip take-up drum, numeral 16 denotes a mold and numeral 17 denotes molten steel. As is well known, in the continuous casting for steel slab, the molten steel is supplied into the mold 16 from a a tundish (not shown) disposed above the mold 16, while the molten metal is discharged as cooled in a form of solidified slab of a rectangular cross-section from the bottom of the mold 16 so that the slab is continuously casted. A mold spacing d between side walls of the mold 16 determines a slab thickness and it varies with a dimension of the slab to be casted. In accordance with a difference between the quantity of the molten steel supplied into the mold 16 from the tundish and the quantity of the discharged molten metal from the bottom of the mold 16, the surface level of the molten steel 17 in the mold 16 changes. The sensor 1 has a detection coil as described later, and when a distance 25 between the sensor 1 and the molten steel level changes, an impedance of the detection coil changes and the sensor produces an electrical signal representative of the change of the distance 25. The electrical signal is detected and amplified by the distance detector 3, an output signal of which is applied to the comparator 5. In the prior art, the output signal of the distance detector 3 is compared with a predetermined reference signal indicative of a predetermined value of the distance between the sensor and the molten metal surface and an error signal therebetween is supplied to the servo motor 7 through the motor driver 6 to drive the servo motor 7, which is turn drives the sensor 1 through the strip 14 wound on the drum 15 to maintain the distance 25 at the predetermined length. Thus, the displacement of the level of the molten steel 17 corresponds to the distance of movement of the strip 14 by the servo motor 7, and the distance of movement is converted by the potentiometer 2 to an electrical signal, which is indicated by the indicator 9 through the amplifier 8 and/or used to control other associated devices (not shown). In such a prior art method, however, it has been found that the output of the sensor 1 significantly changes by noises due to such as influences by a change of size of the mold 16 depending on the dimension of the slab to be casted or a change of the position of the sensor 1 relative to the mold 16. FIG. 2 shows relationships between outputs of the sensor 1 and the positions of the sensor 1 relative to the mold 16, measured for various mold spacings d. An ordinate represents a D.C. output (in volts) of the sensor 1 and an abscissa represents a vertical position of the sensor 1 relative to the mold. The sensor position corresponding to the top of the mold 16 is represented by "0", and the sensor 1 is descended from a position at 155 mm higher than the top of the mold to a lower limit position at −180 mm therefrom. In each mold spacing, the output is more or less influenced by the mold. The influence is largest when the sensor is positioned at "0" mm or near, i.e. near to the top of the mold and the influence is observed even when the sensor is positioned around −80 mm−−100 mm therefrom. The smaller the mold spacing is, the larger is the influence by the mold. When the distance between the molten metal level and the sensor is 90 mm and the reference voltage is −2 volts, it is seen that the mold spacing of 160 mm or less is unmeasurable, and the mold spacing of 180, 200 and 250 mm have errors of 5–40 mm. Thus, it will be seen that the metal surface position detector using a magnetic sensor is affected by not only the metal surface to be measured but also the periphery into which the magnetic fluxes thereof are introduced. The same is true for a sensor which uses an electromagnetic coil. When the molten steel level in the mold is measured, the sensor is influenced by not only the molten steel surface but also the mold surface and the periphery.

In the magnetic flux-balanced sensor, it is seen from FIG. 2 that an error from an ideal value amounts to a value corresponding to 18 mm of the distance between the metal surface and the sensor for the mold spacing of 200 mm, although it depends on the size of the sensor. When the mold spacing is 180 mm or less, the error amounts to a value corresponding to 30 mm of the distance which may be larger than the actual distance to the molten steel level. As a result, it cannot follow the molten steel level in the mold and senses the mold as if it were the molten steel level, thereby preventing the sensor from following the molten steel level.

In the present invention, the noises or the influences imparted to the measurement due to the factors other than the the metal surface-to-sensor distance, as shown in FIG. 2, are stored in a memory, and they are read out of the memory in the measurement operation and applied as correction factors to a measurement control system including the sensor 1 and the motor driver 6. Simply speaking, the detected value less the noises is used as the sensor-to-metal surface distance signal.

The embodiment of FIG. 1 embodies the above principle of the present invention. Numeral 22 denotes a static random access memory (RAM) which is used as the memory described above. Read/write addresses of the RAM 22 are specified by output data of an A/D converter 19. When the environmental noise is written to the RAM 22, an output of the amplifier 8, that is, a sensor level signal is supplied to the A/D converter 19 through a switch 27h while keeping the mold 16 stationary and moving the sensor 1 from the lower limit position to the upper limit position by the servo motor 7, and when the molten steel level is measured, a sum output of an adder 26 is supplied to the A/D converter 19. As well known, in an actual operation, an up-and-down mechanical vibration of constant-cycle and constant-amplitude is applied to the mold 16 by a vibrator 29 so that a relative position of the sensor 1 to the mold 16 periodically changes. In order to compensate for this change, a vibration displacement from a bottom dead point of the vibration is sensed by a displacement sensor 30 and it is applied to the adder 26 where it is added to the position signal of the sensor 1 i.e. output of the amplifier 8, and the relative position of the sensor 1 to the mold 16 is applied to the A/D converter 19. An A/D converter 21 supplies the write data to the RAM 22. When the environmental noise is written into the RAM 22, the distance signal from the detector 3 is applied to the A/D converter 21 through a switch 27e.

When a read/write (R/W) switch 27g is closed, the output data of the A/D converter 21 is stored in the RAM 22 at the address specified by the output data of the A/D converter 19, and when the switch 27g is open, the stored data (environmental noise) of the RAM 22 at the address specified by the output data of the A/D converter 19 is read out to a D/A converter 24. The D/A converter 24 converts the readout data to an analog signal, which is then applied to the adder 12. The adder 12 adds a reference value from the setter 4 to the readout value and supplies a resulting sum to the comparator 5. The reference value represents a predetermined distance which is to be maintained between the sensor 1 and the metal surface under measurement. The operations of the comparator 5, the motor driver 6 and the servo motor 7 have been described above. A switch 27d is inserted between the comparator 5 and the motor driver 6. In a write operation in which the environmental noise (hereinafter referred to as a noise data) is set to the RAM 22, the switch 27d is in a position to connect the motor driver 6 to a motor forward/backward switch 27b. Numeral 27a denotes a noise data write switch, numeral 27c denotes a write switch which is closed in the write operation, and numeral 27f denotes a code change detector which produces a write pulse (plus H) of a predetermined duration when the output code from the A/D converter 19 changes. The code change detector 27f latches the output code from the A/D converter 19 and compares the latched code with the next output code from the A/D converter 19, and if they are not equal, it updates the latched code by the newly applied code and produces the write pulse. The latched code is initially set to "0" at the start of the operation.

The noise data write operation is now explained in a case where the write operation is carried out when the molten metal is absent. An operator first closes the switch 27a. As a result, the switch 27b is connected to the motor driver 6 through the switch 27d, the switch 27e is closed and the output line of the amplifier 8 is connected to the A/D converter 19 through the switch 27h. Then, the mold 16 is located at the bottom dead point in vibration of the mold by the vibrator 29 and throws the switch 27b to a side of +Vcc or −Vcc so that the motor 7 is driven forwardly or backwardly to move the sensor 1 to the bottom point or the top point of the vertical movement range. For the sake of convenience to the following description, it is assumed that the motor 7 is driven forwardly (by applying a voltage of +Vcc) to position the sensor 1 at the bottom point. Then, the operator closes the switch 27c and throws the switch 27b to the side of −Vcc. As a result, the motor 7 is driven backwardly at a constant speed so that the sensor 1 is moved up at a constant speed. As the sensor 1 goes up, the output voltage (sensor level signal) of the amplifier 8 linearly changes. Consequently, the digital output value of the A/D converter 19 changes by "1" each time when the analog output value of the amplifier 8 changes by the amount corresponding to the minimum unit of the digital output of the A/D converter 19. When the digital output of the A/D converter 19 changes by "1", the detector 27f produces a pulse, which causes the switch 27g to be closed through the switch 27c to instruct the "write" operation to the RAM 22. Thus, each time when the sensor 1 goes up by the distance corresponding to the minimum unit of the A/D converter 19, that is, each time when the output code of the A/D converter 19 changes by "1", the current output or the current noise data of the detector 3 is written into the RAM 22 at the address specified by the output code. When the sensor 1 reaches the top point, the operator returns the switch 27b to a neutral position to stop the motor 7 and opens the switch 27c.

The measurement operation is now explained. After the molten steel 17 has been supplied to the mold 16, the operator opens the switch 27a. As a result, the comparator 5 is connected to the motor driver 6 through the switch 27d, the switch 27e is opened, and the adder 26 is connected to the A/D converter 19 through the switch 27h. Consequently, the adder 26 supplies to the A/D converter 19 the relative position signal, which is derived by correcting the position of the sensor 1 (output of the amplifier 8) by the displacement due to the vibration of the mold 16. Thus, the access address of the RAM 22 is specified by the relative position data of the sensor 1 to the vibrating mold 16 and the noise data stored at the specified address is read out and converted to an analog data by the D/A converter 24, and the analog data is supplied to the adder R where it is added to the value representing the predetermined reference distance 25, and a resulting sum is applied to the comparator 5. The comparator 5 compares the output of the distance detector 3 with the output of the adder 12 and produces a signal (plus or minus) representing a difference therebetween, that is, a difference between the detector output less the environmental noise, which should represent the correct metal surface distance, and the reference value. This signal is supplied to the motor driver 6 through the switch 27d. As a result, even when the metal surface moves up and down, the follow-surface control to keep the distance between the metal surface and the sensor 1 at the reference distance can be attained. In the prior art, as described above, the distance between the metal surface and the sensor 1 could significantly deviate from the reference distance because of the inclusion of the noise in the detector data and hence the indication by the indicator 9 includes a large error. In the present embodiment, since the reference value is corrected by the adder 12 so that the environmental noise is cancelled at the comparator 5, the sensor 1 exactly follows the movement of the metal surface and the distance between the metal surface and the sensor 1 is kept at the reference value and therefore, the indication of the indicator 9 is exact.

The write operation described above is carried out under a condition that no molten steel exists in the mold 16. In order to further reduce the error, it is advisable to fix a non-magnetic metal plate of about 10 mm thickness such as lead plate or aluminum plate to the sensor 1 at a position below the sensor 1 spaced by a distance equal to the reference distance between the sensor 1 and the metal surface to be measured and to move the sensor 1 together with the non-magnetic metal plate up and down in the mold 1 and store the output values of the sensor 1 at various levels of the sensor 1.

Since the molten steel is non-magnetic, the non-magnetic metal plate is substantially equivalent to the molten steel to be measured. Thus, the output of the sensor includes the value representing the distance which would exist between the sensor 1 and the molten metal surface if the sensor 1 exactly follows the molten metal surface with the reference distance and the environmental noises. Therefore, when the write operation is carried out in this manner, it is not required in the measurement operation to add the reference distance to the output of the D/A converter 24 in the adder 12 and thus, the reference signal setter 4 and the adder 12 can be omitted.

FIGS. 3 and 4 show relations between the level of the sensor 1 or the level output and the level of the lead plate surface (corresponding to the molten metal level) with mold spacings of 140 mm and 160 mm. The noise by the mold, an ideal measurement value, a comparative value by the prior art and a corrected measurement value by the present invention are plotted. The ordinate represents the level (mm) of the sensor 1 or the level output and the abscissa represents the lead plate surface level (mm) (corresponding to the molten metal level). In the measurement, the reference distance between the sensor 1 and the lead plate surface is set to 90 mm. Thus, the sensor 1 detects the lead plate surface from a position distant by 90 mm therefrom. The noise by the mold 16 is shown by a DC output of the sensor 1. The sensor 1 used in the measurement is different from that used in the measurement of FIG. 2 and hence the output values are different from each other.

In the prior art, as seen from the figures, the sensor 1 cannot descend below +48 mm level from the top end of the mold when the mold spacing is 140 mm and hence the sensor 1 does not follow the level change of the lead plate surface but senses as if the lead plate were at the level of +48 mm. For the 160 mm mold spacing, the sensor 1 cannot descend below a level of +20 mm and also it involves a larger error from the ideal value so that the sensor 1 cannot be applicable to the level measurement. When the noise by the mold 16 is compensated in accordance with the present invention, an error from the ideal value is 5 mm at maximum, if not zero, and the present invention significantly facilitates the measurement and improves the accuracy in measurement. While not shown in FIGS. 3 and 4, when the noise by the mold 16 was compensated by using the noise data measured as moving the metal plate together with the sensor 1 as described above, an error from the ideal value was less than 1 mm.

In the embodiment shown in FIG. 1, the output signal from the static RAM 11 and the output signal from the reference level setter 4 are added together by the adder 12. Alternatively, as shown in FIG. 5, the output signal from the detector 3 connected to the sensor 1 and the output signal from the reference level setter 4 may be applied to the adder 12 and a resulting sum may be stored in the RAM 22. In this case, during the write operation of the noise data by moving the sensor 1 up and down, a switch 28 is closed if the mold 16 is empty and opened if the non-magnetic metal plate (e.g., lead plate or aluminum plate) is attached below the sensor 1.

In FIG. 6, the adder 12 is replaced by a subtractor 12a so that the noise data stored in the RAM 22 is subtracted from the output signal of the detector 3 connected to the sensor 1, and a resulting difference is compared with the output signal from the reference level setter 4.

In this embodiment, the write operation may be carried out by using a non-magnetic metal plate fixed to the sensor 1 with a predetermined distance therebetween. In that case, the output of the subtractor 12a is directly applied to the motor driver 6.

FIG. 7 shows another embodiment, in which a microcomputer system 31 writes the noise data and effects the follow-surface control of the sensor 1 in the measurement operation by actuation of a key switch 32. In the microcomputer system 31, when the key switch 32 is closed to instruct the write operation of the noise data, a central processing unit (CPU) 31a starts to execute a memory routine shown in a flow chart of FIG. 8 under control of a program stored in a ROM 31c. In a step 801, the system 31 is initialized so that the data N which specifies the write address of the RAM 22 is set to "0" and the motor 7 is driven to position the sensor 1 at the top position. In a step 802, the motor driver 6 is instructed to descend the sensor 1. Then the program proceeds with the steps for writing the noise data in the RAM 22. That is, in a step 803, an A/D converter 31d is instructed to A/D-convert a signal on its input channel 3 and produce a resulting converted data D, and if the converted data is different from the previously stored write address data (step 804), the current converted data D is used to update the write address N of the RAM 22 (step 806). Then, the A/D converter 31d is instructed to A/D-convert a signal on its input channel 2 and produce a converted data P (step 807), and the data P is written into the RAM 22 at the address N (step 808). The above operation is repeated until the converted data D of the input channel 3 of the A/D converter 31d assumes a value DL representing the bottom point of the sensor 1, when the motor driver 6 is instructed to stop the downward movement and start the upward movement (steps 808 and 809). When the converted data D of the input channel 3 of the A/D converter 31d assumes a value Du representing the top point, the motor driver 6 is instructed to stop the motor (steps 811 and 812). Thus, the memory routine terminates.

When the key switch 32 is operated to instruct the measurement operation, the system 31 executes a measurement routine shown in FIG. 9 under control of the program stored in the ROM 31c to measure the metal surface level. The system 31 instructs the A/D converter 31d to convert signals on its input channels 1, 2 and 3 sequentially and reads out vibration displacement data S, detection distance data M and sensor level data X, respectively (steps 901, 902 and 903), calculates X+S=N (step 904), accesses to the address N of the RAM 22 to read out the noise data P (step 905), calculates M-P which should correspond to a compensated exact distance measurement value (step 906), compare a resulting difference M-P with the predetermined reference distance data K (step 907), if they are equal, instructs to stop the movement of the sensor 1 and repeats the above steps, and if they are not equal, instructs to drive the motor 7 to move the sensor 1 in the direction to cause them equal (steps 909 and 910), and then returns to the step 901.

The above memory routine and the measurement routine are executed at a timing determined by clock signals from a clock signal generator (not shown) contained in the system 31. One cycle of each routine is selected to be shorter than a time period required for the sensor 1 to be moved by a distance corresponding to the minimum unit of the digital value which is derived from the A/D conversion of the signal on the input channel 3 of the A/D converter 31d.

Thus, the present invention is capable of measuring the position of metal surface accurately without being affected by noises due to metallic subjects other than the metal to be measured.

Although the present invention has been described with reference to specific embodiments, it should be understood that the present invention is not limited to the structure shown in the embodiments and various modifications may be made within the scope of the claims.

What is claimed is:

1. An apparatus for measuring a change along a predetermined direction of a surface position of a metallic mass comprising:

a magnetic sensing type metal sensor reciprocably movable along said predetermined direction and arranged in spaced relation to said metal surface, drive means operative to drive said sensor along said predetermined direction, follow-surface means for comparing an output of said sensor with a predetermined reference distance value and activating said drive unit in accordance with a difference signal of the comparison for causing said sensor to follow the change along said predetermined direction of the surface position of said metal, means for determining the surface position of said metal based on a current position of said sensor, noise storing means for measuring a noise component in the output of said sensor due to factors other than the change of the surface position of said metal and storing said noise component; and correction means for correcting said difference signal by said noise component stored in said storing means for activating said drive unit by the corrected signal.

2. An apparatus according to claim 1 wherein said storing means includes means for measuring noise component as locating said sensor at each of a plurality of positions along a moving pass of said sensor and means for storing the noise component measured at each of the positions, and said correction means corrects the output of said sensor by the noise component stored in said storing means at the position corresponding to the current sensor position determined by said surface position determining means.

3. An apparatus according to claim 2 wherein said noise component measured by said measuring means is obtained by the output of said sensor produced when said sensor reaches each of said plurality of positions while said sensor is moved within a range of said moving pass under a condition that said metal being removed.

4. An apparatus according to claim 2 or 3 wherein said measuring means produces position signals for indicating said plurality of positions, respectively, for the measurement of said noise components and signals representing the noise components at said plurality of positions, respectively, and said storing means has a plurality of addressable locations and stores said noise components at the address locations specified by said position signals.

5. An apparatus according to claim 4 wherein said correction means reads out the noise components stored at the address locations specified by said position signals produced by said measuring means to correct the outputs of said sensor.

6. An apparatus according to claim 2, said measuring means measures said noise component under a condition that a non-magnetic metal plate is fixed to said sensor with a distance therebetween substantially equal to said predetermined reference distance.

7. Apparatus according to claim 2 wherein said metal surface is a molten metal level in a mold.

* * * * *